(12) United States Patent
Noe et al.

(10) Patent No.: US 11,455,612 B2
(45) Date of Patent: Sep. 27, 2022

(54) PAYMENT SYSTEMS AND METHODS FOR MANAGING PAYMENT CARD USE

(71) Applicant: MasterCard International Incorporated, Purchase, NY (US)

(72) Inventors: James C Noe, Kent (GB); Ian D A Maddocks, Milton Keynes (GB); Sowmya R Lakka, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1099 days.

(21) Appl. No.: 14/857,976

(22) Filed: Sep. 18, 2015

(65) Prior Publication Data

US 2016/0140535 A1    May 19, 2016

(30) Foreign Application Priority Data

Sep. 22, 2014  (GB) ...................................... 1416734

(51) Int. Cl.
| | | |
|---|---|---|
| *G06Q 20/00* | (2012.01) | |
| *G06Q 20/32* | (2012.01) | |
| *G06Q 20/22* | (2012.01) | |
| *G06Q 20/34* | (2012.01) | |
| *G06Q 20/20* | (2012.01) | |

(Continued)

(52) U.S. Cl.
CPC ........... *G06Q 20/322* (2013.01); *G06Q 20/10* (2013.01); *G06Q 20/20* (2013.01); *G06Q 20/227* (2013.01); *G06Q 20/32* (2013.01); *G06Q 20/3572* (2013.01); *G06Q 20/3574* (2013.01); *G06Q 20/405* (2013.01)

(58) Field of Classification Search
CPC ............ G06Q 20/327; G06Q 20/3278; G06Q 20/4014
See application file for complete search history.

(56) References Cited

U.S. PATENT DOCUMENTS

| | | | | |
|---|---|---|---|---|
| 6,490,443 B1 * | 12/2002 | Freeny, Jr. | ............. | G06Q 20/32 455/406 |
| 8,587,454 B1 * | 11/2013 | Dearworth | ........... | G07B 15/063 340/5.1 |

(Continued)

FOREIGN PATENT DOCUMENTS

| | | |
|---|---|---|
| CN | 101303753 A | 11/2008 |
| CN | 102479361 A | 5/2012 |

(Continued)

OTHER PUBLICATIONS

NFC in Public Transport, NFC Forum, Inc., Jan. 2011 (Year: 2011).*

(Continued)

*Primary Examiner* — Bruce I Ebersman
(74) *Attorney, Agent, or Firm* — Otterstedt & Kammer PLLC (57) ABSTRACT

A method, at a mobile device, of assigning a preferred payment application stored on the mobile device to a merchant, the method comprising the steps of: receiving a selection of a merchant at the mobile device; receiving a selection of a preferred payment application; and mapping the payment application to the merchant by creating a record containing an application identifier and a merchant identifier.

8 Claims, 6 Drawing Sheets

(51) Int. Cl.
*G06Q 20/40* (2012.01)
*G06Q 20/10* (2012.01)

(56) References Cited

U.S. PATENT DOCUMENTS

| | | | |
|---|---|---|---|
| 8,751,391 B2* | 6/2014 | Freund | G06Q 20/10 705/35 |
| 2008/0052236 A1 | 2/2008 | Narayanaswami et al. | |
| 2009/0192913 A1 | 7/2009 | Saito | |
| 2010/0029202 A1 | 2/2010 | Jolivet | |
| 2010/0051685 A1 | 3/2010 | Royyuru | |
| 2010/0082445 A1 | 4/2010 | Hodge | |
| 2011/0180598 A1 | 7/2011 | Morgan | |
| 2011/0231223 A1 | 9/2011 | Winters | |
| 2011/0320345 A1* | 12/2011 | Taveau | G06Q 20/32 705/39 |
| 2012/0109764 A1 | 5/2012 | Martin | |
| 2012/0191612 A1* | 7/2012 | Spodak | G06K 19/07707 705/65 |
| 2013/0090991 A1* | 4/2013 | Underwood | G07B 15/063 705/13 |
| 2013/0124349 A1 | 5/2013 | Khan | |
| 2013/0144793 A1 | 6/2013 | Royston | |
| 2013/0212012 A1 | 8/2013 | Doherty et al. | |
| 2013/0246258 A1 | 9/2013 | Dessert | |
| 2014/0012704 A1* | 1/2014 | Mizhen | G06Q 30/06 705/26.41 |
| 2014/0040120 A1 | 2/2014 | Cho et al. | |
| 2014/0108119 A1 | 4/2014 | Choi | |
| 2014/0143107 A1 | 5/2014 | Kim et al. | |
| 2015/0134428 A1* | 5/2015 | Li | G07B 15/063 705/13 |
| 2015/0186864 A1* | 7/2015 | Jones | G06Q 20/322 705/39 |
| 2015/0339652 A1 | 11/2015 | Park et al. | |
| 2016/0203464 A1* | 7/2016 | Fustes | G07B 15/063 705/13 |

FOREIGN PATENT DOCUMENTS

| | | |
|---|---|---|
| CN | 102804219 A | 11/2012 |
| CN | 103577982 A | 2/2014 |
| CN | 104021470 A | 9/2014 |
| JP | 2006-277670 A | 10/2006 |
| JP | 2007-102319 A | 4/2007 |
| JP | 2007-141055 A | 6/2007 |
| JP | 2009-99076 A | 5/2009 |
| JP | 2010-505192 A | 2/2010 |
| JP | 2010-191694 A | 9/2010 |
| JP | 2011-002937 A | 1/2011 |
| JP | 2011-203837 A | 10/2011 |
| JP | 2014-119807 A | 6/2014 |
| KR | 2011-0121209 A | 11/2011 |
| KR | 10-1330962 B | 11/2013 |

OTHER PUBLICATIONS

Alissa Walker, Watch How You'll Soon Pay Your Subway Fare With a Tap of Your Phone, Gizmodo, https://gizmodo.com/watch-how-youll-soon-pay-your-subway-fare-with-a-tap-of-1777451112, May 18, 2016 (Year: 2016).*
NPL3: Airports, Watch the Money . . . There is a Lot of It, https://www.parkingtoday.com/articledetails.php?id=892&t=airports-watch-the-money-there-is-a-lot-of-it, Parkng Today Media, Apr. 2010 (Year: 2010).*
NFC in Public Transportation (Year: 2011).*
Airports, Watch the Money . . . (Year: 2010).*
Australian Patent Office, Examination Report No. 1 for standard patent application, dated Nov. 16, 2017, 4 pages. Australian Application No. 2015321656.
Canadian Intellectual Property Office, Examination Search Report, dated Feb. 5, 2018, 3 pages, Canadian appln No. 2961898.
European Patent Office Supplementary Search Report, dated Mar. 27, 2018, 9 pages, EPO Appln 15843184.1.
Korean Intellectual Property Office Patent Examination Report, dated Jan. 11, 2018, Korean Patent Application No. 10-2017-7010915, 11 pages, English Translation.
Japan Patent Office Notice of Reason for Refusal, Japanese Appln. No. 2017-535617, dated Jan. 30, 2018, 4 pages. (English translation).
A. O. Blaine Copenheaver, USPTO as ISA, Patent Cooperation Treaty Written Opinion, PCT/US2015/051145, dated Feb. 5, 2016, 10 pages.
A. O. Blaine Copenheaver, USPTO as ISA, Patent Cooperation Treaty International Search Report, PCT/US2015/051145, dated Feb. 5, 2016, 5 pages.
Counterpart Chinese Patent Application 20150065188.0, Payment Systems and Methods for Managing Payment Card Use, notice of allowance dated Apr. 27, 2021 (Chinese language with English Translation) 7 pages total.
Counterpart Chinese Patent Application 20150065188.0, Payment Systems and Methods for Managing Payment Card Use, PAtent certificate dated Jun. 22, 2021 (Chinese language with English Translation) 19 pages total see listing of cited references on p. 4.
Counterpart Chinese Patent Application 20150065188.0, Payment Systems and Methods for Managing Payment Card Use, office action dated Sep. 27, 2020 (Chinese language with English Translation) 31 pages total.
Counterpart European Patent Application 15 843 184.1 -1213, summons to attend oral proceedings dated Nov. 11, 2020 12 pages total.

* cited by examiner

PAYMENT SYSTEMS AND METHODS FOR MANAGING PAYMENT CARD USE

CROSS REFERENCE TO RELATED APPLICATIONS

This application claims foreign priority to United Kingdom Patent Application 1416734.0, filed 22 Sep. 2014, the complete disclosure of which is expressly incorporated herein by reference in its entirety for all purposes.

FIELD OF THE INVENTION

The present invention relates generally, but not exclusively, to the use of devices capable of performing transactions with multiple payment terminals and merchants using a selection of payment applications loaded onto the devices, in particular, to the selection of the payment application in multi payment application devices during a face to face payment in the device's normal powered operation and also during the devices low power mode operation.

BACKGROUND TO THE INVENTION

Multi payment application devices, such as an NFC enabled mobile phone, can store multiple payment credentials, each being a payment application on the device, typically residing in the device's secure element. As such, the same multi payment application device is capable of performing transactions using any one of the payment credentials loaded which are linked with one or more issuers and bank accounts.

When a multi payment application device is used to perform a transaction, for example, by presenting the multi payment application device at a payment terminal, a means of selecting which payment card to use in the transaction is required. Many multi payment application devices have user interface applications installed on them which enable a user to manually select which payment credential to use. These are commonly called wallets or wallet applications.

What is commonly known as a Proximity Payment System Environment (PPSE) is often used to facilitate the payment credential selection mechanism when a contactless payment transaction is performed. The PPSE lists the 'default' payment credential or credentials by including an ordered list of payment applications that a terminal will can automatically select from based on the payment application's position in the list and compatibility with the terminal. For contact based transaction, commonly know as Chip transactions, the equivalent of the PPSE is the Payment System Environment (PSE) and operates in the same manner.

When a multi payment application device is used to perform a transaction over a payment network using PPSE, the first payment application in the ordered list is identified by a payment terminal to which the multi payment application device has been presented. The payment terminal then attempts to perform a transaction using the first payment application. If the attempt to perform a transaction using the first payment application is not possible, for example, because the terminal does not support the payment network which the payment application uses, the payment terminal will identify the next payment application in the ordered list and check if it is compatible. The payment terminal will keep identifying the next payment application in the ordered list until a compatible payment application is found and the payment application is selected and used to perform a transaction, or until no more payment applications are found at which point the transaction will be rejected.

Every time a user wants to use a payment application other than the default payment application (the first application on the ordered list), they must actively select the payment application that they do want to use, for example, by running a wallet application on the multi payment application device. This can lead to undue delay, particularly when compared with the use of conventional payment cards where the user can quickly chose which of their payment cards to use in any given transaction without the need to open an application on a multi payment application device and select which payment application to use. It can also lead to accidental use of the wrong payment application in a particular transaction where the automatically selected payment application is not the payment application which the user intended to use.

Additional problems can arise where the multi payment application device loses power and enters low power mode. In low power mode, there may not be enough power available to run a user interface or operating system at the device. Low power mode is defined as a state the secure element and NFC Controller enter to use minimal power. Typically this mode is used when a consumer electronics device reaches a low battery threshold and the device automatically switches off many of its functions, except the clock and a few remaining functions such as its NFC functionality. This is described in detail in the ETSI TS 102 613 and GSMA NFC Handset Requirements.

As such, in low power mode it would then no longer be possible for the user to select which payment credential to use in a given transaction. This can cause issues in, for example, transit type transactions where a user taps their multi payment application device at the start of a journey (tap in) and taps their multi payment application device once again at the end of their journey (tap out) resulting in a fare calculation based on where the user has tapped. If the payment credential with which the user has chosen to tap in with is not the highest matching application in the ordered list in the PPSE of the user's multi payment application device and if the user's multi payment application device enters low on power during transit, the situation could arise where the user is unable to tap out using the same payment credential and is forced to tap with a different payment credential. In many cases, in particular where a user has already tapped in but has not yet tapped out, this can lead to the user receiving a fine in relation to either or both payment credential presentments or the maximum possible fare may be charged to each payment credential.

The situation can also arise where the user's multi payment application device runs low on power and enters low power mode before the user attempts to make a transaction. In this situation, once the multi payment application device enters low power mode, the user would only be able to perform transactions using the default list of payment credentials with the payment terminal through which the transaction is to be performed. As such, the user no longer has any control over which card to use, may suffer financially, and may also be unable to gain fully from any capping that might be offered by the transit authority.

Accordingly, there is a need to provide for improved automated payment card selection in multi payment application devices.

SUMMARY OF THE INVENTION

According to a first aspect of the invention, there is provided a method, at a mobile device, of assigning a preferred payment application stored on the mobile device to a merchant, the method comprising the steps of: receiving a selection of a merchant at the mobile device; receiving a selection of a preferred payment application; and mapping the payment application to the merchant by creating a record containing an application identifier and a merchant identifier.

Advantageously, by mapping the payment application to the merchant by creating a record containing a card identifier and a merchant identifier, the method of the first aspect of the invention enables the payment application use-preferences of a user of the mobile device to be reflected when a transaction is performed without the need to run a wallet application, and even if the mobile device were running on low power mode.

The method of first aspect of the invention may further comprise the steps of: receiving a record request message from a terminal; and sending a record containing the application identifier and the merchant identifier(s) to a terminal.

The method of first aspect of the invention may further comprise the steps of: receiving a record request message from a terminal; and sending a plurality of records, each record containing an application identifier, and at least one record containing a merchant identifier.

The merchant identifier of the first aspect of the invention may identify one of a unique merchant, a unique terminal or a group of merchants.

The merchant identifier of the first aspect of the invention may identify a group of merchants using a merchant category code.

The step of receiving a selection of a merchant at the mobile device of the first aspect of the invention may comprise receiving an input from a user via a user interface of the mobile device.

The step of receiving a selection of a preferred payment application at the mobile device of the first aspect of the invention may comprise receiving an input from a user via a user interface of the mobile device.

The step of creating a record containing an application identifier and a merchant identifier of the first aspect of the invention may comprise adding a merchant identifier to a record containing the application identifier.

According to a second aspect of the invention, there is provided a method, at a terminal, of selecting a payment application stored on a mobile device, the method comprising the steps of: sending a record request message to the mobile device; receiving one or more records from the mobile device; searching the one or more records for a merchant identifier which is associated with the terminal; if an associated merchant identifier is found, searching the record which contains the associated merchant identifier for an application identifier; and processing a transaction using a payment application identified by the application identifier.

Advantageously, by searching the one or more records for a merchant identifier that are associated with the terminal, the method of the second aspect of the invention enables the user of the mobile device to have improved control over which payment credentials are used with which merchant, as the terminal is able to identify which payment application to use by identifying the application identifier stored in the same record as the associated merchant identifier, thereby providing for an efficient user experience.

The method of the second aspect of the invention may further comprise the step of terminating a transaction process if no associated merchant identifier is found.

The method of the second aspect of the invention may further comprise the step of searching the one or more records for a default payment application if no associated merchant identifier is found.

The step of searching the one or more records for a default payment application of the second aspect of the invention may comprise performing, at the terminal, a payment application selection following standard processes.

The merchant identifier of the second aspect of the invention may identify one of a unique merchant, a unique merchant location or a group of merchants.

The merchant identifier of the second aspect of the invention may identify a group of merchants using a merchant category code.

The merchant identifier of the second aspect of the invention may identify a transit merchant.

According to a third aspect of the invention, there is provided a method, at a mobile device, of prioritising a preferred payment application stored on the mobile device, the method comprising the steps of: detecting a transaction of a multiple-transaction payment; detecting which payment application was used to perform the transaction; and assigning a highest priority value to a record which contains an application identifier which identifies the payment application used to perform the transaction.

Advantageously, by assigning a highest priority value to a record which contains an application identifier which identifies the payment application used to perform the transaction, the method of the third aspect enables the user of the mobile device to perform subsequent transactions using the same payment application as was used for the prior transaction, even if the mobile device enters a low power mode.

The method of the third aspect of the invention may further comprise the step of detecting whether the mobile device is about to enter a low power mode, wherein the step of assigning a highest priority value to a record which contains an application identifier which identifies the payment application used to perform the transaction is performed when it is detected that the device is about to enter low power mode.

The step of assigning a highest priority value to a record which contains an application identifier which identifies the payment application used to perform the transaction of the third aspect of the invention may occur automatically once the step of detecting which payment application was used to perform the transaction has occurred.

The transaction of the third aspect of the invention may be a tap that can be classified as a multiple-transaction payment by virtue of a zero value transaction or a Merchant Category Code.

The highest priority value of the third aspect of the invention may only assigned for a predetermined period of time.

The mobile device of any of the first, second and third aspects of the invention may be one of a plastic card, a mobile phone, a watch, a tablet, a laptop, or a consumer electronic device.

The transaction of either of the second and third aspects of the invention may be a transit aggregation type transaction performed with a transit merchant.

BRIEF DESCRIPTION OF DRAWINGS

Embodiments of the present invention will now be described, by way of example only, with reference to the accompanying drawings, in which:

FIG. 1b depicts a flow diagram of the processes which occur in the four-party payment system of FIG. 1a;

DETAILED DESCRIPTION

Multi payment application devices can take many forms. Multi payment application devices can be consumer devices, conventional physical payment cards, mobile phones, watches or any suitable device upon can support the credentials of multiple payment accounts and perform transactions with multiple merchants.

The credentials of any kind of payment card may be stored on such devices including credit, debit, prepaid and charge cards.

The credentials may each be stored in the form of a payment application. The terms payment credential and payment application may be used interchangeably.

Typically, each payment application resides in a secure element comprising a part of the multi payment application device. In other embodiments, some or all of the payment applications will reside in the device's operating system memory or a trusted execution environment (TEE) when host card emulation (HCE) is utilized.

Multi payment application devices may be capable of performing conventional contact, commonly known as Chip, based transactions and/or contactless transactions.

Figure 1A:
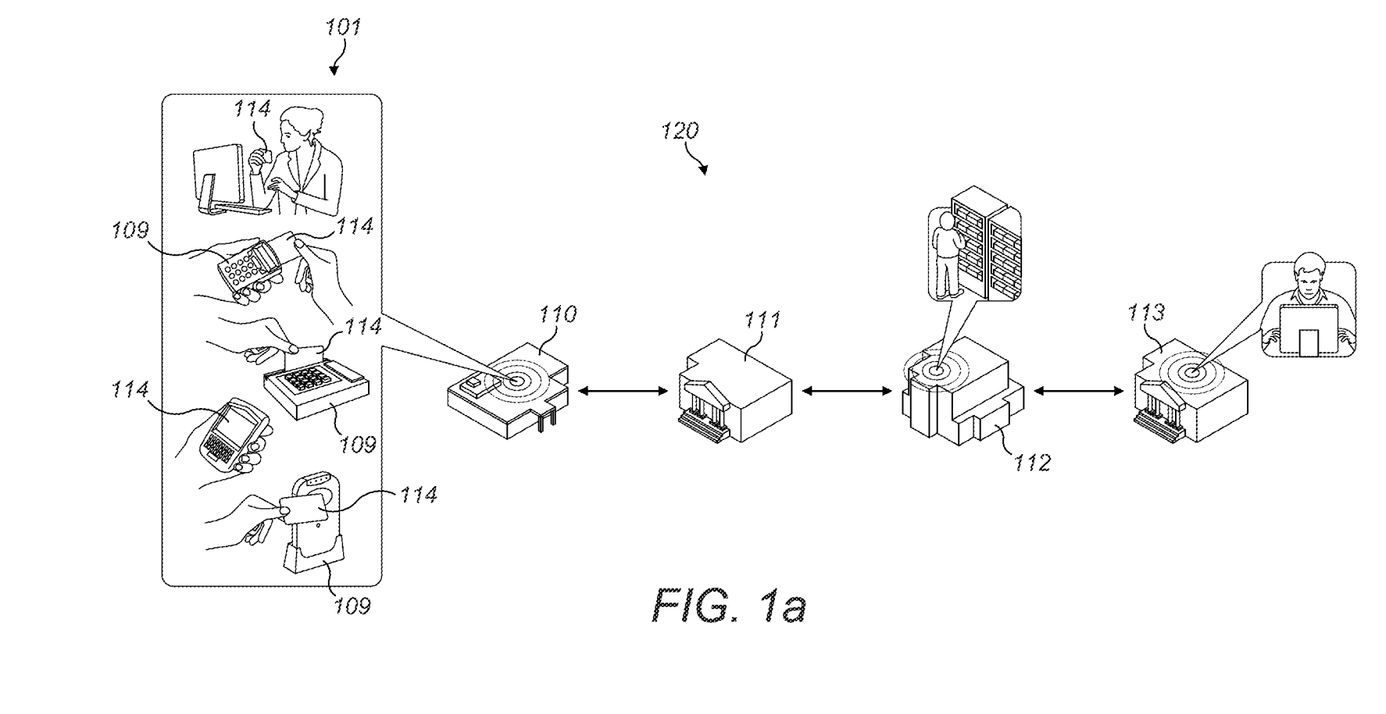
FIG. 1a depicts an operating model of the parties involved when a multi payment application device is used to perform a transaction over a four-party payment system.
Figure 1B:
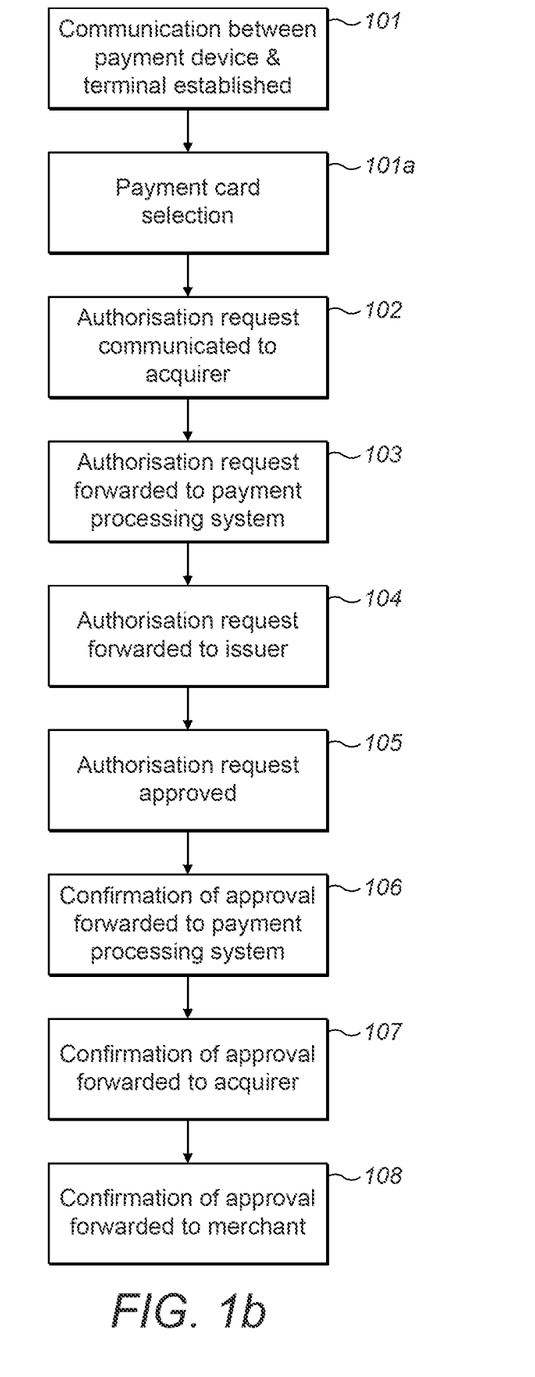

FIG. 1a depicts an operating model of the parties involved when a multi payment application device is used to perform a transaction over a four-party payment system. FIG. 1b depicts a flow diagram of the processes which occur in the four-party payment system of FIG. 1a. Together, FIGS. 1a and 1b represent a successful transaction made using a four-party payment system. The model includes a multi payment application device 114 and a terminal 109 (sometimes referred to as a "Point of Sale" or POS terminal). The terminal 109 is typically retained by a merchant 110. The merchant 110 typically has a contract with a financial institution to accept payments from payment devices such as a multi payment application device 114. That financial institution (i.e. the merchant's bank) is the acquirer 111. The issuer 113 is the financial institution that has issued the multi payment application device 114 to a particular customer (i.e. the customer's bank). The acquirer 111 and the issuer 113 are linked by the payment processing system 112. Together, the merchant 110, the acquirer 111, the payment processing system 112, and the issuer 113 comprise a payment processing network 120.

In the exemplary operating model of FIG. 1, a multi payment application device 114 is presented to a merchant 110 who possesses a terminal 109. The multi payment application device 114 interacts with the terminal 109 and a communication is established (step 101). Once the connection between the terminal 109 and the multi payment application device 114 is established, a transaction is initialised at the terminal 109.

For multi payment application device, payment card credentials need to be selected (step 101a). This step can take place either before step 101 or after step 101 and before step 102.

The terminal 109 then communicates an authorisation request to the acquirer 111 (step 102). The acquirer 111 forwards the request on to the payment processing system 112 (step 103), which determines which issuer 113 is associated with the multi payment application device 114. The payment processing system 112 then forwards the authorisation request on to the issuer 113 for transaction approval (step 104).

Here, the payment processing system 112 may validate the multi payment application device's security features before forwarding the authorisation request 104. The issuer 113 then checks certain criteria, such as account status, and approves the authorisation request if those checks return satisfactory results (step 105). This approval is then forwarded on to the acquirer 111 via the payment processing system 112 (steps 106 and 107). The acquirer 111 sends the approval on to the merchant 110, which receives confirmation via the terminal 109 (step 108).

Many four-party payment systems adhere to the EMV™ standard, developed by Europay™ (which has subsequently merged with MasterCard™), MasterCard™ and Visa™. Other members have since joined. The EMV™ standard provides open specifications for chip-based payment devices and terminals to facilitate global interoperability for transactions.

The key element of the EMV™ standard involves including dynamic digital data in every transaction. Dynamic digital data makes these types of transactions extremely secure and reduces the risk of fraud. A consumer payment application is resident in a secure Integrated Circuit Card (ICC) or chip. This can be the contact chip in smart cards or the contactless chip in smart cards or personal devices such as smart phones. There are standards based on ISO/IEC 7816 for contact cards, and standards based on ISO/IEC 14443 for contactless cards/devices.

An EMV™ standard chip is able to perform processing and contains a secure element which stores information and performs cryptographic functions.

Typically, each payment application resides in such a secure element. In other embodiments the payment application will reside in the multi payment application device's operating system memory or a trusted execution environment (TEE) when host card emulation (HCE) is utilized.

When an EMV™ standard enabled device is used to pay at an EMV™ standard enabled terminal, it can be identified as an authentic, approved payment instrument through a process called authentication (this is an almost instant process where offline data authentication is available). When used with a Personal Identification Number (PIN) or other form of consumer device based cardholder verification, the chip (or, in online verification, the issuer) verifies that the consumer is indeed in possession of his or her own device, through recognising that the correct PIN or other form of cardholder authentication has been completed. This implementation of the EMV™ standard is commonly known as "Chip and PIN".

The transaction flow of EMV™ standard transactions is much the same as that of the four-party system described above, but with the addition of authentication using chip data and chip technology.

Focussing now on the payment application selection step 101a shown in FIG. 1b, wherein a selection is made as to which payment application to use when performing a transaction, there are multiple ways in which this step can take place. For example, a user can select which payment credentials they would like to use for a particular merchant transaction. This user selection can be made via a wallet application. This step can also take place automatically with the use of a Proximity Payment System Environment (PPSE) which has been preconfigured.

Figure 2:
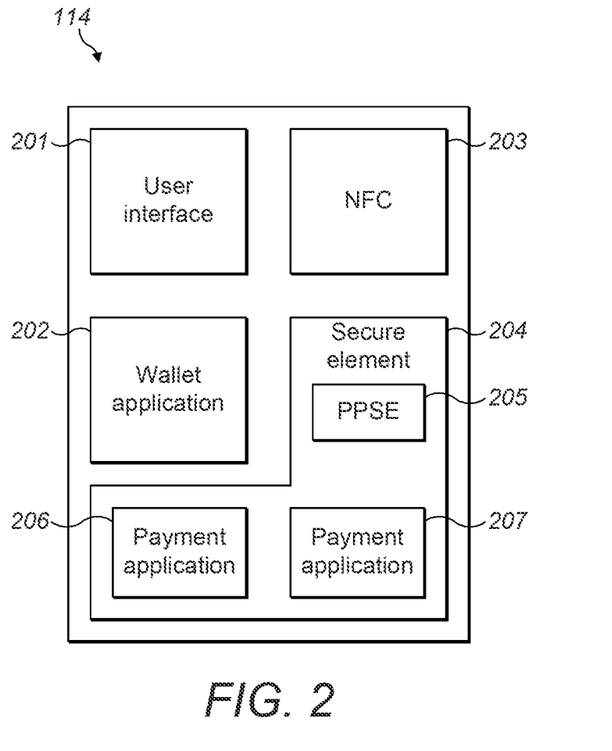
FIG. 2 depicts a representation of an exemplary multi payment application device.

FIG. 2 depicts a representation of an exemplary multi payment application device 114. The multi payment application device 114 depicted comprises a user interface 201, a wallet application 202, a Near-Field Communication (NFC) module 203 which enables the multi payment application device 114 to wirelessly communicate with other NFC enabled devices, and a secure element 204 which further comprises a PPSE 205, and payment applications 206 and 207. In other embodiments the payment applications reside in the device's operating system memory or a trusted execution environment (TEE) when host card emulation (HCE) is utilized.

A PPSE 205 is an applet which can be stored on the secure element 204 (or within the devices operating system if HCE technology is used) of a multi payment application device 114. During a transaction, the PPSE 205 presents one or more available payment applications to the terminal 109.

In known transaction processes, the PPSE 205 presents an ordered list of available payment applications to the terminal 109, each application being part of a set of applications being presented in the form of an Application Definition File (ADF) record. Each ADF record contains an Application Definition File Name (ADF Name), and each ADF Name uniquely identifies a payment application and is the payment application's Application Identifier (AID). Each ADF record may also contain an Application Priority Indicator (API) which comprises a value which reflects the ADF record's position in the aforementioned ordered list.

The wallet application 202 can communicate with an application 206 or 207 or the PPSE 205 to activate the required payment credentials and configure the PPSE ADF records.

Figure 3:
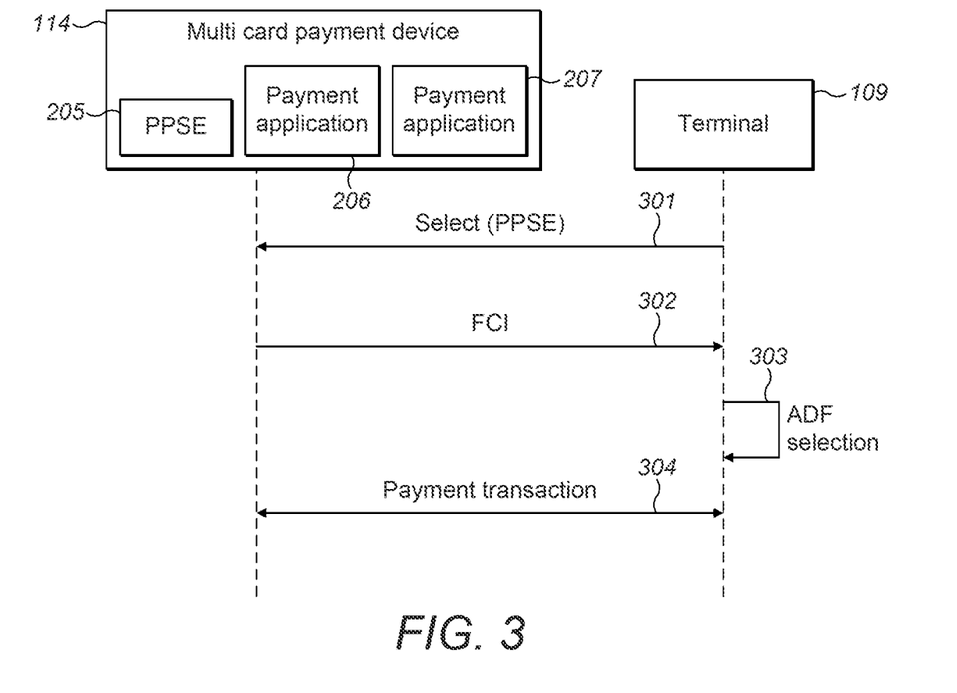
FIG. 3 is a message flow diagram depicting the steps involved in an exemplary known method for performing payment card selection in multi payment application devices.

FIG. 3 is a message flow diagram depicting the steps involved in an exemplary known method for performing the payment card selection step 101a of the transaction process shown in Figure 1b where a Proximity Payment System Environment (PPSE) is used for determining payment application selection.

At step 301, the multi payment application device 114 is presented at terminal 109. This may involve presenting or tapping the multi payment application device 114 at the terminal 109, where the device includes an NFC module 203 or any other suitable wireless communication means. Alternatively, the multi payment application device 114 may be inserted into the reader and may interface with the reader via, for example, a contact point such as an exposed chip, in such as case the PPSE role is provided by a PSE. Once an interface between the multi payment application device 114 and the terminal 109 has been established, the terminal sends a SELECT (PPSE) command to the multi payment application device 114 via the interface which requests access to the PPSE 205 and the ADFs contained therein.

At step 302, the multi payment application device 114 responds to the select command by responding with the PPSE's File Command Information (FCI) containing the ADF record(s) stored in the PPSE including the ADF Name for each ADF record to the terminal 109.

At step 303, the terminal 109 determines which of the payment applications contained in the received ADF records to use for the transaction. The terminal 109 does this by identifying the first ADF record in the ordered list which matches with the terminal's capabilities. The terminal 109 starts by looking at the first ADF record in the ordered list, which is the ADF record with the highest priority API. Once this 'highest priority' or 'first' ADF record in the list has been identified by the terminal 109, the terminal then check whether the ADF Name contained within the first ADF record are compatible with the terminal 109. If an ADF Name contained within the first ADF record is determined to be compatible with the terminal 109, the terminal 109 then selects this application, using the ADF Name as the application's AID.

It may be the case that the first ADF record is not compatible with the terminal 109. In this case the terminal 109 will then identify the ADF record of next highest priority (the 'second' ADF record in the list) again by identifying the ADF record with the highest priority API. If an ADF Name contained within the second ADF record is determined to be compatible with the terminal 109, the terminal 109 then selects this ADF record.

If the second ADF record is not compatible, the payment terminal 109 will keep identifying the payment card of next highest priority until a compatible ADF Record is found and the transaction proceeds or until no more ADF Records are found at which point the transaction will be rejected As such, the process of determine the best match is a matter of using the ADF Record with the highest Application Priority Indicator (API).

At step 304 the terminal 109 begins a payment transaction with the selected application, for example either of application 206 and application 207. As known to those who are skilled in the art, a payment transaction may consist of several commands and responses between the terminal 109 and the multi payment application device 114, as well as further responses from the selected payment application 206 or 207. Payment data may be sent from the payment application 206 or 207 to the terminal 109 and is built into an authorisation request 102 by the terminal 109 and sent to acquirer 111 by the terminal 109.

For payment credentials that are enabled to the user, the user may change the API of each of the ADF records present on the multi payment application device 114.

However, in known multi card payment devices 114 which make use of a PPSE 205, the user is only typically able to rank one ADF record in an ordered list of ADF records at a time. A terminal iterates through the ordered list sequentially, as outlined above. As such, the user is limited to having to set which payment credential should be used prior to each transaction or accept a default credential (i.e. the first compatible credential in the ordered list).

In particular, problems may arise where a multi payment application device 114 runs low on power such that it is running in a low power mode. When in low power mode, the battery on the device may not have sufficient power to run the operating system, but there may be enough power to run the secure element 204 and NFC controller 203 for period of time or operations. For example, while in low power mode the device may not have enough power to run a display or user interface 201, but there may be enough power to perform ten to twenty NFC taps over the course of one to two days.

In low power mode, it would no longer be possible for the user to select which payment credential to use in a given transaction, for example, by using a wallet application 202. In such a scenario, the user would be forced to perform transactions using the first payment credential that is compatible with the terminal 109, that is the ADF with the highest priority API in the default PPSE configuration, if a default configuration has been set. As such, the user no longer has any flexibility.

For example, where a user desires that a specific payment credential be used for transport payments on a multi payment application device 114, if the user attempts to enter a transit system while the device is in low power mode the user would be unable to enter the transit system using the specific payment credential unless the specific payment credential was set at the highest priority in the PPSE 205. Furthermore, the specific payment credential may not be suitable for use in other payments, in which case it would not be desirable to set it at the highest priority in the PPSE 205. If the specific payment credential were not set at the highest priority in the PPSE 205, the terminal at the transit entrance would attempt to select the default payment credential provided at the PPSE 205, but as the desired specific payment credential is not set as the 'default' payment credential in the PPSE 205, in low power mode, the user would be forced to use the default payment credential.

Additionally ticket inspection could result in the user being unable to present the same payment credential if their multi payment application device enters low power mode during the journey.

Furthermore certain situations would not allow a user time to access a wallet application 202 to select a preferred payment credential, for example, high throughput transit gates where the user is afforded little time to select which card to use on approaching the gate. So automatically selecting the correct payment card without user interaction may be advantageous.

The proposed solution to this problem is to include additional information within each ADF record which enables the user to select which ADF records should be selected by which merchants when a transaction is performed. This overrides conventional use of a priority associated with each ADF record and reduces, if not removes, the need for user interaction with a wallet application 202 prior to each transaction. A user can specify which payment cards should be used with which merchants, without needing access to the wallet prior to the transaction, even in low power mode.

The aforementioned additional data may be in the form of a Merchant Identifier (MI) or list of Merchant Identifiers. An MI included in an ADF record may identify terminals 109 belonging to a single merchant or it may identify terminals 109 belonging to all merchants in a particular sector, for example, transit or fast food. An MI may be based on the ISO 8583:1993 defined merchant category code extended with a merchant identifier. An MI may include geographic zoning based on a sub set of a ZIP code. An MI may include day or week or time of day definitions. An MI may comprise one or more of a partial zip code, merchant name and location, and date/time.

Together these MI conditionals allow the flexibility for the user to define targeted payment credential usage without needing to make an active selection via the wallet 202, segmenting transport, business/personal and types of purchases to credentials of their choice.

The user is able to define and select which MI or MIs to include in each ADF record stored on the multi payment application device 114. The multi payment application device 114 may, for example, be able to select a particular ADF record (which represents a particular payment credential) and select a particular merchant or group of merchants (a merchant identifier). The multi payment application device 114 may then map the payment credential onto the merchant by including an MI which comprises the selected merchant or group of merchants in the selected ADF record, in effect creating a new ADF record comprising an MI and means for identifying a payment application. The MIs of each ADF record are then passed on to a terminal 109 which can use the MIs to determine which ADF record should be used selected to perform the transaction.

A particular payment credential may be restricted by the Issuer of said payment credential such that a user can only select certain merchants or groups of merchants as the MI for said payment credential.

A particular payment credential may be locked by the Issuer of said payment credential such that the use of said payment credential may only be used with a specific merchant or group of merchants. This may be implemented by locking a particular MI to the particular payment credential.

An exemplary set of ADF records stored in the PPSE may comprise a first ADF record which comprises a ADF Name and an API with the highest priority value, a second ADF record which comprises an ADF Name and an MI which identifies transit authority A, and finally a third ADF record which comprises an ADF Name and an MI which identifies a retail merchant B at a specific location to be used Monday through Friday.

During the application selection stage of a transaction, if the terminal 109 to which the multi payment application device 114 is being presented belongs to transit authority A, the terminal 109 would select the second ADF record. If the terminal 109 to which the multi payment application device 114 is being presented belongs to retail merchant B, the terminal 109 would select the third ADF record if it was a weekday alternatively it would select via the API process and use the first ADF record. All terminals belonging to other merchants would select the first ADF record.

In other embodiments the multi payment application device issuer or user may not wish to support payments that do not match one of the listed MIs. For example while transit is supported in low power mode retail payment should not be supported. To address this requirement the highest priority ADF record identifies a payment application that is configured to always decline transactions or always decline transactions in low power mode.

Figure 4:
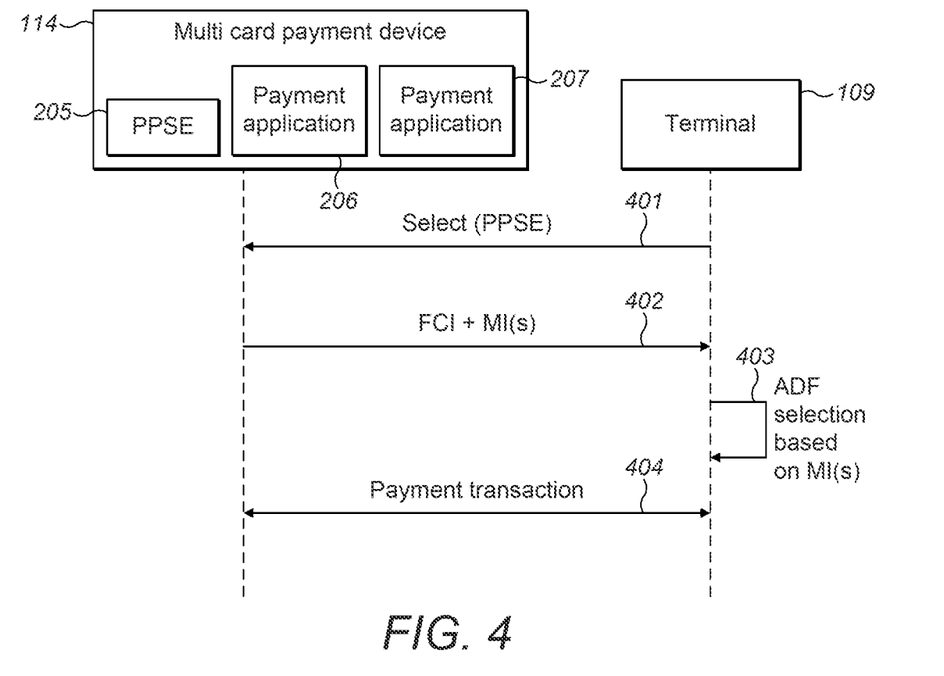
FIG. 4 is a message flow diagram depicting the steps involved in a method for performing the payment application selection in multi payment application devices.

FIG. 4 is a message flow diagram depicting the steps involved in a method for performing the payment application selection step 101a of the transaction process shown in Figure 1b where a Proximity Payment System Environment (PPSE) is used for application selection and where additional MI data is used.

Step 401 may be the same as step 301, although the SELECT (PPSE) command may also include an indication that the terminal 109 is capable of processing MI data.

At step 402, the multi payment application device 114 responds to the select request by sending File Command Information (FCI) containing the ADF records stored in the PPSE including the MIs for each ADF record to the terminal 109. An ADF Name for each ADF record may also be included.

At step 403, the terminal 109 is configured to first check the MI of each ADF record when determining which of the payment applications contained in the received ADF records to use for the transaction. The terminal 109 checks the MI of each ADF record to identify whether the terminal 109 falls within the MI of any of the ADF records. If an ADF record is found which contains an MI which encompasses the terminal 109, this ADF record is chosen.

Optionally, if the terminal 109 does not find a match via the MI data, it may then perform the standard selection processing, based solely on the API and terminal compatibility, as outlined above.

As step 404, the ADF Name of the chosen ADF is used to select the required payment application and a payment transaction continues, for example, via any suitable known transaction process.

The payment transaction may occur close to or remotely to the user selectable range of merchants. For example, if the proposed solution is incorporated into a smart-fridge that automatically orders new stock online, the merchant is located remotely from the payment transaction. A smart-fridge incorporating the proposed solution may choose different payment credentials depending on the product it attempts to order, for example, to maximise loyalty points for specific merchants.

Advantageously, if a multi payment application device 114 were to run low on power such that a user would be unable to use a wallet application 202 to manually select which payment card to use in a given transaction, the above outlined inclusion of MI data would enable the payment credential use preferences of the user to be reflected when a transaction is performed using the multi payment application device 114, even if the multi payment application device 114 were running on low power mode.

Furthermore, the inclusion of an MI in one or more of the ADF records provides the user with improved control over which payment card credentials are used with which merchants, thereby providing an enhanced user experience, and in the case of high throughput transit, ensuring quick and efficient movement of people through the transit gates.

If a multi payment application device 114 which makes use of a PPSE 205 comprising ADF records containing MI data is used to perform a transaction with a legacy terminal which cannot read MI data, an API may also be included in one or more of the ADF records and the API may be used to perform conventional payment card selection as shown in FIG. 3.

Problems can arise in the automatic selection of payment applications on multi payment application devices 114 through the use of a PPSE 205 when the transaction being performed is a transaction with a variable amount. Transactions with variable amounts include those commonly performed in transit type transactions where a user presents their multi payment application device 114 (taps in) at the beginning of a journey and presents their multi payment application device 114 once more (taps out) at the end of their journey, at which point the fare is calculated. Such a transaction with a variable amount can be detected by a multi payment application device 114 as being a transit transaction with zero value.

If the multi payment application device 114 were to run low on power after the user had tapped in and before the user had tapped out, although the user would be able to perform default transactions using the multi payment application device 114, the user would be unable to select which of the payment credentials stored on the multi payment application device 114 to use when tapping out. If the payment credential with which the user had chosen to tap in with is not the first application in the PPSE of the user's multi payment application device 114 (i.e. the application of highest priority), the situation could arise where the user is unable to tap out using the same payment credential and is forced to tap out with a different payment credential.

The proposed solution to this problem is to include automatically setting the payment application which was used by the user to tap as the payment application of highest priority in the PPSE of the multi payment application device 114. This may be done automatically after a user taps in. This may be done by setting the API of the ADF record associated with this payment application that the user used to tap to the highest priority value.

Figure 5:
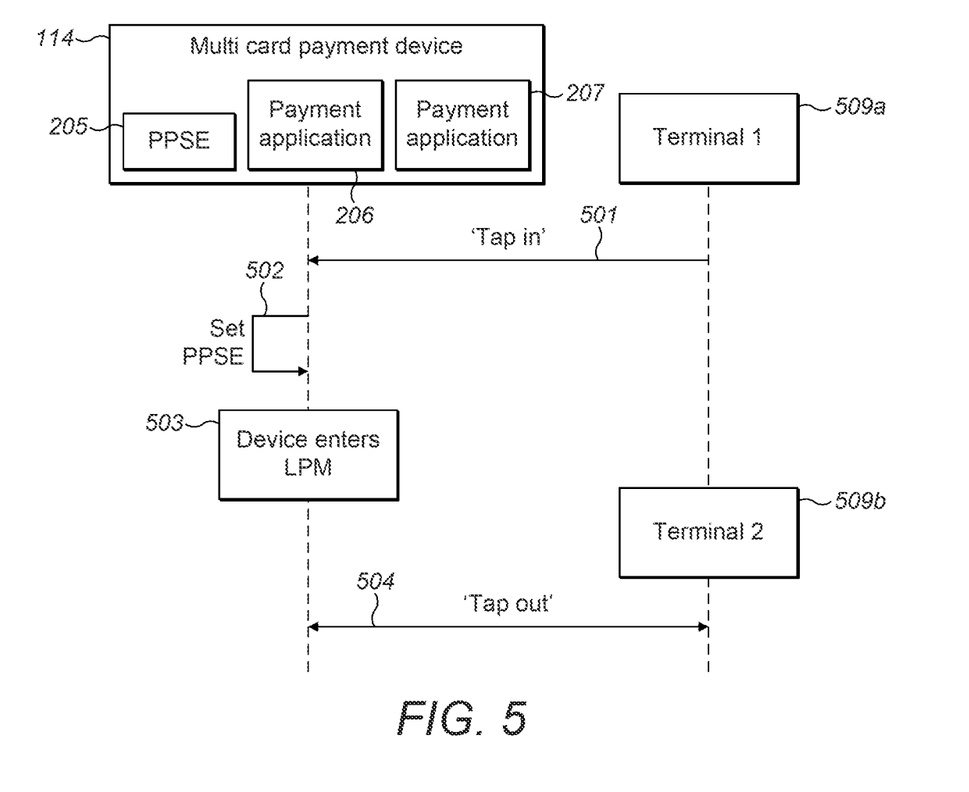
FIG. 5 is a message flow diagram depicting the steps involved in setting the payment credential which a user has used in a first transaction as the payment application of highest priority in the PPSE of the multi payment application device.

FIG. 5 is a message flow diagram depicting the steps involved in a method for setting the payment credential which a user has used in a first transaction as the payment application of highest priority in the PPSE of the multi payment application device 114.

At Step 501, a user taps in at terminal 509*a* with multi payment application device 114. This step may comprise local authentication of the user to the payment application for example, via a wallet application 202 and a transaction being performed using said payment credential.

At step 502, the payment credential which was used by the user to tap at a terminal classified as one with a requirement to tap to complete, such as a Merchant Category Code of Transit, is set as the payment application of highest priority in the PPSE. This step may involve setting the API of the ADF record which was used to perform the tap to the highest priority value.

There may be various scenarios which, when they occur, trigger the multi payment application device 114 to perform step 502.

For example, the multi payment application device 114 may detect that step 501 is a tap in type transaction with a variable amount billing or the multi payment application device 114 may detect that step 501 is an intermediary tap type transaction (i.e. where a tap in type transaction has already occurred, but a tap out type transaction is still expected to ensue) and may automatically perform step 502 whenever such a transaction, as embodied in step 501, is performed. This ensures that if the device does fall into low power mode during transit, the default values have already been set in the PPSE so that the correct card can be used when tapping out.

The multi payment application device 114 may detect that it is low on power and that it will soon enter low power mode, so it may automatically perform step 502 whenever such a detection is made. Alternatively the PPSE application could support two configurations, one configuration for normal power mode and one configuration for low power mode, in which case the wallet could set the low power mode configuration after detecting a transaction of type 501, in preparation for a low power mode event.

The multi payment application device 114 may perform step 502 in response to a user input, via the User Interface 201 of the multi payment application device 114, which requests that the multi payment application device 114 enter low power mode.

Step 502 could be completed following agreement from the user, for example with a user prompt, via the UI 201, of "Do you want to set this card as default to make sure it is used on your exit?", to which the user could respond via the UI 201, or step 502 could be completed automatically, notifying the user that the step has occurred, for example, with a user prompt, via the UI 201, of "Note: This card will be set as your default card if the handset loses power in the next hour".

The multi payment application device 114 may perform step 502 whenever a transaction of any type using a particular payment credential is performed and not just when a transaction of type 501 is performed.

Step 502 might occur where, during step 501, the multi payment application device 114 is able to detect that the transaction is for a zero value amount, and that the merchant category code is that of a transit agency. The multi payment application device 114 may then deduce that this transaction is a transit "aggregation" transaction, where it is essential that any other taps in this environment use the same set of credentials. As such, when this exemplary method is employed, the PPSE 205 is update to reflect the payment credentials that the user selected for their tap in, so that, should the device enter low power mode whilst travelling, the user is still able to present the same payment credentials upon exiting the transit system, or upon being inspected.

Step 502 may be reversed after a predetermined period of time has elapsed with the original PPSE ordering being reinstated.

At step 503, the multi payment application device 114 enters low power mode.

At step 504, the user taps out at terminal 509b with the multi payment application device 114. As the user is unable to select which payment credential to use as the multi card payment device 114 is running in low power mode, terminal 509b performs a payment application selection using the aforementioned payment application selection process, as detailed in FIG. 3 and the description thereof. Given that the payment application which was used to tap in has been set as the payment application of highest priority, the terminal 509b will perform the transaction using the credential of the payment application which was previously used to tap.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method, at a mobile device, of prioritising a preferred payment application stored on the mobile device, the method comprising the steps of:
   identifying an execution of a tap-in transaction in a multiple-transaction payment, the multiple-transaction payment utilizing tap-in and tap-out occurrences of identifying a payment application;
   determining which payment application was used to perform the tap-in transaction;
   assigning a highest priority value to a record which contains an application identifier which identifies the determined payment application used to perform the tap-in transaction;
   detecting that the mobile device is about to enter a low power mode, wherein the step of assigning a highest priority value to a record which contains an application identifier which identifies the determined payment application used to perform the tap-in transaction is performed when it is detected that the mobile device is about to enter the low power mode; and
   completing the execution of the tap-out transaction in the low power mode using the determined payment application, wherein:
   the low power mode is characterized by a lack of power for running a user interface, an operating system, or both on the mobile device, such that a user of the mobile device cannot select a desired payment application during the low power mode;
   the multiple-transaction payment is associated with a tap-in tap-out transit journey where the user is fined if the user cannot tap out with the same payment application used to tap in; and
   the step of assigning the highest priority value to the record when it is detected that the mobile device is about to enter the low power mode allows the user to tap out in the low power mode using the determined payment application used to tap in even though the user cannot select the determined application in said low power mode.

2. The method of claim 1, wherein the step of assigning a highest priority value to a record which contains an application identifier which identifies the determined payment application used to perform the tap-in transaction occurs automatically once the step of determining which payment application was used to perform the tap-in transaction has occurred.

3. The method of claim 1, wherein the tap-in transaction is a tap that can be classified as a multiple-transaction payment by virtue of a zero value transaction or a Merchant Category Code.

4. The method of claim 1, wherein the highest priority value is only assigned for a predetermined period of time.

5. The method of claim 1, wherein the mobile device is one of a plastic card, a mobile phone, a watch, a tablet, a laptop, or a consumer electronic device.

6. The method of claim 1, wherein mobile device is one or more of a secure element based device and a host card emulation based device.

7. The method of claim 1, wherein the tap-in and tap-out transactions define a transit aggregation type transaction performed with a transit merchant.

8. A mobile device, the mobile device comprising:
   a memory;
   at least one processor coupled to said memory; and
   a non-transitory persistent storage medium which contains instructions which, when loaded into said memory, configure said at least one processor to be operative to prioritize a preferred payment application stored on the mobile device by:
   identifying an execution of a tap-in transaction in a multiple-transaction payment, the multiple-transaction payment utilizing tap-in and tap-out occurrences of identifying a payment application;
   determining which payment application was used to perform the tap-in transaction;
   assigning a highest priority value to a record which contains an application identifier which identifies the determined payment application used to perform the tap-in transaction;
   detecting that the mobile device is about to enter a low power mode, wherein the step of assigning a highest priority value to a record which contains an application identifier which identifies the determined payment application used to perform the tap-in transaction is performed when it is detected that the mobile device is about to enter the low power mode; and completing the execution of the tap-out transaction in the low power mode using the determined payment application, wherein:

the low power mode is characterized by a lack of power for running a user interface, an operating system, or both on the mobile device, such that a user of the mobile device cannot select a desired payment application during the low power mode;

the multiple-transaction payment is associated with a tap-in tap-out transit journey where the user is fined if the user cannot tap out with the same payment application used to tap in; and the step of assigning the highest priority value to the record when it is detected that the mobile device is about to enter the low power mode allows the user to tap out in the low power mode using the determined payment application used to tap in even though the user cannot select the determined application in said low power mode.

* * * * *